(12) United States Patent
Kori et al.

(10) Patent No.: US 9,054,568 B2
(45) Date of Patent: Jun. 9, 2015

(54) PERMANENT MAGNET ROTATING ELECTRIC MACHINE

(71) Applicant: Hitachi, Ltd., Chiyoda-ku, Tokyo (JP)

(72) Inventors: Daisuke Kori, Hitachinaka (JP); Motonobu Iizuka, Hitachi (JP); Atsushi Fukunaga, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 161 days.

(21) Appl. No.: 13/767,492

(22) Filed: Feb. 14, 2013

(65) Prior Publication Data

US 2013/0221784 A1 Aug. 29, 2013

(30) Foreign Application Priority Data

Feb. 27, 2012 (JP) ................. 2012-039521

(51) Int. Cl.
*H02K 1/27* (2006.01)
*H02K 7/14* (2006.01)

(52) U.S. Cl.
CPC .................. *H02K 1/27* (2013.01); *H02K 1/276* (2013.01); *H02K 7/14* (2013.01)

(58) Field of Classification Search
USPC ............. 310/156.23, 156.27–156.29, 156.31, 310/156.53, 156.56, 156.57
IPC .......................................... H02K 1/276,1/2766
See application file for complete search history.

(56) References Cited

U.S. PATENT DOCUMENTS

| | | | | |
|---|---|---|---|---|
| 4,144,469 A * | 3/1979 | Miyashita et al. | ....... | 310/156.28 |
| 7,560,842 B2 * | 7/2009 | Hattori | ..................... | 310/156.53 |
| 7,948,138 B2 * | 5/2011 | Hattori et al. | ............ | 310/156.53 |
| 8,487,495 B2 * | 7/2013 | Takizawa | ................. | 310/156.53 |
| 2002/0047435 A1 | 4/2002 | Takahashi et al. | | |
| 2007/0063607 A1 * | 3/2007 | Hattori | ..................... | 310/156.53 |
| 2009/0224623 A1 | 9/2009 | Saito et al. | | |
| 2012/0032539 A1 | 2/2012 | Hori et al. | | |

FOREIGN PATENT DOCUMENTS

| | | |
|---|---|---|
| JP | 2001-339919 A | 12/2001 |
| JP | 2002-044926 A | 2/2002 |
| JP | 2002-359942 A | 12/2002 |

(Continued)

OTHER PUBLICATIONS

Japanese Office Action dated Jul. 1, 2014 with English translation (Twelve (12) pages).

*Primary Examiner* — Dang Le
(74) *Attorney, Agent, or Firm* — Crowell & Moring LLP

(57) ABSTRACT

A permanent magnet rotating electric machine includes a rotor and a stator. The rotor includes: a permanent magnet forming a single pole within a rotor core of the rotor, the permanent magnet being divided into two divided permanent magnets; a connecting portion assuming an electrical steel sheet disposed between the two divided permanent magnets; and magnet insertion holes in which the permanent magnets are inserted. In the rotor, the magnet insertion holes are shaped to include: air gaps at both end portions in a width direction of the permanent magnet, each air gap being formed between a surface of the permanent magnet extending perpendicularly to the magnetization direction and a surface of the electrical steel sheet facing the surface of the permanent magnet; a shoulder portion disposed on the facing surface; and another air gap extending toward a rotor outside diameter side and the magnetic pole center side.

20 Claims, 10 Drawing Sheets

(56) References Cited

FOREIGN PATENT DOCUMENTS

| JP | 2003-299280 A | 10/2003 |
|----|---------------|---------|
| JP | 2004-104966 A | 4/2004  |
| JP | 2006-311730 A | 11/2006 |
| JP | 2006-316628 A | 11/2006 |
| JP | 2007-089291 A | 4/2007  |
| JP | 2008-12852 A  | 1/2008  |
| JP | 2009-213235 A | 9/2009  |
| JP | 2012-039775 A | 2/2012  |

\* cited by examiner $1.5 \leqq d1/d0 \leqq 2.5$

PERMANENT MAGNET ROTATING ELECTRIC MACHINE

BACKGROUND OF THE INVENTION

1. Field of the Invention

The present invention relates to a permanent magnet pump motor having a permanent magnet rotating electric machine that includes a rotor and a stator, and a permanent magnet pump motor system incorporating the same.

2. Description of the Related Art

Unlike ordinary pump systems, LNG pump motors have an integrated structure in which a rotor, a stator, an impeller, and a diffuser are built into a pump casing. Such a LNG pump motor is operated in an LNG fluid having a temperature of −162° C. and thus there arise problems inherent in low temperatures.

Rare-earth magnets, such as neodymium magnets and praseodymium magnets, in particular, have a property that the permanent magnet contracts in a magnetization direction and expands in a direction perpendicular to the magnetization direction at low temperatures.

This requires that linear expansion of the electrical steel sheet and the permanent magnet be taken into consideration for the shape of a magnet insertion hole in the electrical steel sheet in which the magnet is to be inserted.

In addition, since the motor is operated with the LNG packed therein, loss caused by fluid friction occupies a good part of loss of the motor. Making a rotor compact is effective in reducing the fluid friction.

Under the circumstances, various forms of permanent magnet rotor structures are being examined relative to electrical characteristics of the motor and the magnet insertion hole in the rotor, as disclosed in JP-2006-311730-A.

SUMMARY OF THE INVENTION

JP-2006-311730-A discloses a magnet insertion hole shape having a filling portion between a magnet insertion hole in a rotor and a magnet and air gaps disposed on both end portions of the magnet. This allows an adhesive to be poured into a gap between the magnet and an electrical steel sheet to thereby even out a surface of the electrical steel sheet in contact with the magnet with the adhesive. An excessive stress occurring locally in the magnet can thereby be reduced.

However, when the machine is used under an extremely low temperature condition, such as with the LNG, air bubbles present in the filling portion expand and contract as affected by a sudden change in temperature from room temperature to low temperature or vice versa. As a result, stress on the magnet and the rotor occurs, causing the magnet and the rotor to be deformed or damaged.

JP-2009-213235-A discloses a structure in which a non-magnetic portion is disposed in a magnet insertion hole in a rotor, so that a tensile stress or a bending stress occurring in the rotor can be limited. Similarly to the arrangement disclosed in JP-2006-311730-A, application of the arrangement disclosed in JP-2009-213235-A to the LNG pump motor is not practicable, since the magnet and the magnet insertion hole have no air gap for considering the linear expansion.

In addition, JP-2006-311730-A also describes that the gap between the magnet and the magnet insertion hole is filled with, for example, varnish. This suggests that the related-art arrangements have no consideration of having an air gap between the magnet and the magnet insertion hole serving as an air layer.

An object of the present invention is to provide a permanent magnet pump motor that is operated in a condition of being packed with LNG and that prevents a magnet and a rotor from being deformed or damaged and reduces fluid friction by having a small-diameter rotor.

To achieve the foregoing object, an aspect of the present invention provides a permanent magnet rotating electric machine that includes a rotor and a stator, the rotor comprising: a permanent magnet forming a single pole within a rotor core of the rotor, the permanent magnet being divided into two across a magnetic pole center and arranged such that the magnetic pole center and a magnetization direction of the permanent magnet extend in parallel with each other; a connecting portion assuming an electrical steel sheet disposed between the two divided permanent magnets; and magnet insertion holes in which the permanent magnets are inserted, wherein the magnet insertion hole is shaped to include: air gaps at both end portions in a width direction of the permanent magnet, each air gap being formed between a surface of the permanent magnet extending perpendicularly to the magnetization direction and a surface of the electrical steel sheet facing the surface of the permanent magnet; a shoulder portion disposed on the facing surface, the shoulder portion having a length shorter than a thickness in the magnetization direction of the permanent magnet; and another air gap extending toward a rotor outside diameter side and the magnetic pole center side in a direction perpendicular to the shoulder portion on an outside of the shoulder portion.

According to the present invention, a permanent magnet pump motor that takes into consideration the linear expansion of the permanent magnet and the electrical steel sheet and achieves reduced fluid friction can be obtained.

BRIEF DESCRIPTION OF THE DRAWINGS

Other objects and advantages of the invention will become apparent from the following description of embodiments with reference to the accompanying drawings in which.

DESCRIPTION OF THE PREFERRED EMBODIMENTS

Figure 1:
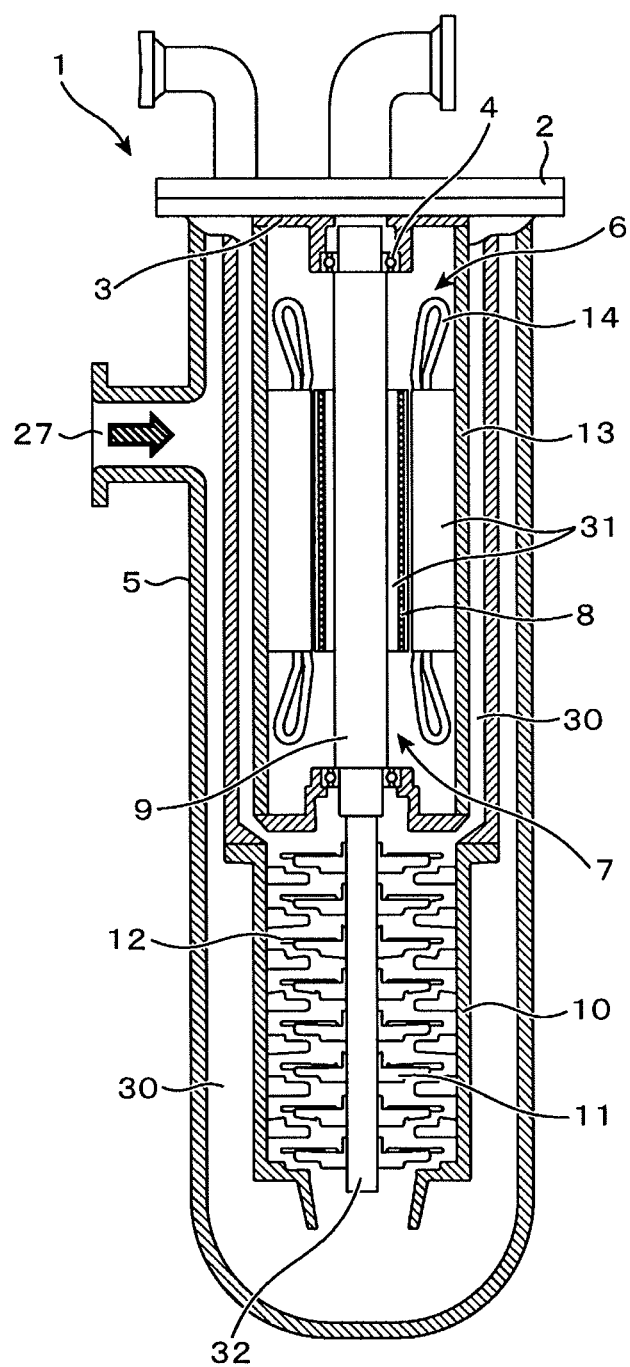
FIG. 1 is a diagram illustrating a permanent magnet pump motor according to a first embodiment of the present invention.

Preferred embodiments of the present invention will be described in detail below with reference to the accompanying drawings, wherein like reference numerals refer to like parts throughout.

First Embodiment

FIG. 1 is a cross-sectional view showing a permanent magnet pump motor according to a first embodiment of the present invention. The permanent magnet pump is applied to an LNG plant delivering power on the order of several megawatts. Three-phase alternating current power is supplied from an inverter 25 to the permanent magnet pump motor that operates at a speed in a range from 500 to 7000 min$^{-1}$.

As shown in FIG. 1, a motor portion is disposed inside the pump and the pump is operated in a vertical position with LNG at about −162° C. packed therein. A permanent magnet pump motor 1 is covered in an outermost case called a pot 5 and a head cover 2 for hermetically sealing components disposed inside the pot 5. A stage case 10 is disposed inside the pot 5. A flow path 30 through which LNG 27 flows is disposed between the pot 5 and the stage case 10. An impeller 11, a diffuser 12, and a motor case 13 that assume major pump components are disposed inside the stage case 10.

The flow path 30 through which the LNG 27 flows is similarly formed between the stage case 10 and the motor case 13. A stator 6 including an electrical steel sheet 31 to which a coil 14 is applied is fixed to, and disposed inside, the motor case 13. Similarly to the stator 6, a rotor 7 includes an electrical steel sheet 31 in which a permanent magnet 8 is disposed and to which a shaft A 9 is fastened. A neodymium magnet is used for the permanent magnet 8.

Alternatively, a praseodymium magnet that offers a good magnetic property at low temperatures, such as with the LNG, may be used. SUS630 that has undergone a subzero treatment is used for the shaft A 9 that is used at extremely low temperatures (−162° C.). A shaft B 32 to which the impeller 11 and the diffuser 12 are fastened is connected to an end portion of the shaft A 9. Bearing brackets 3 are disposed on both ends in the axial direction of the motor case 13. The rotor 7 is supported by the bearing brackets 3 and bearings 4 disposed in the bearing brackets 3.

Figure 2:
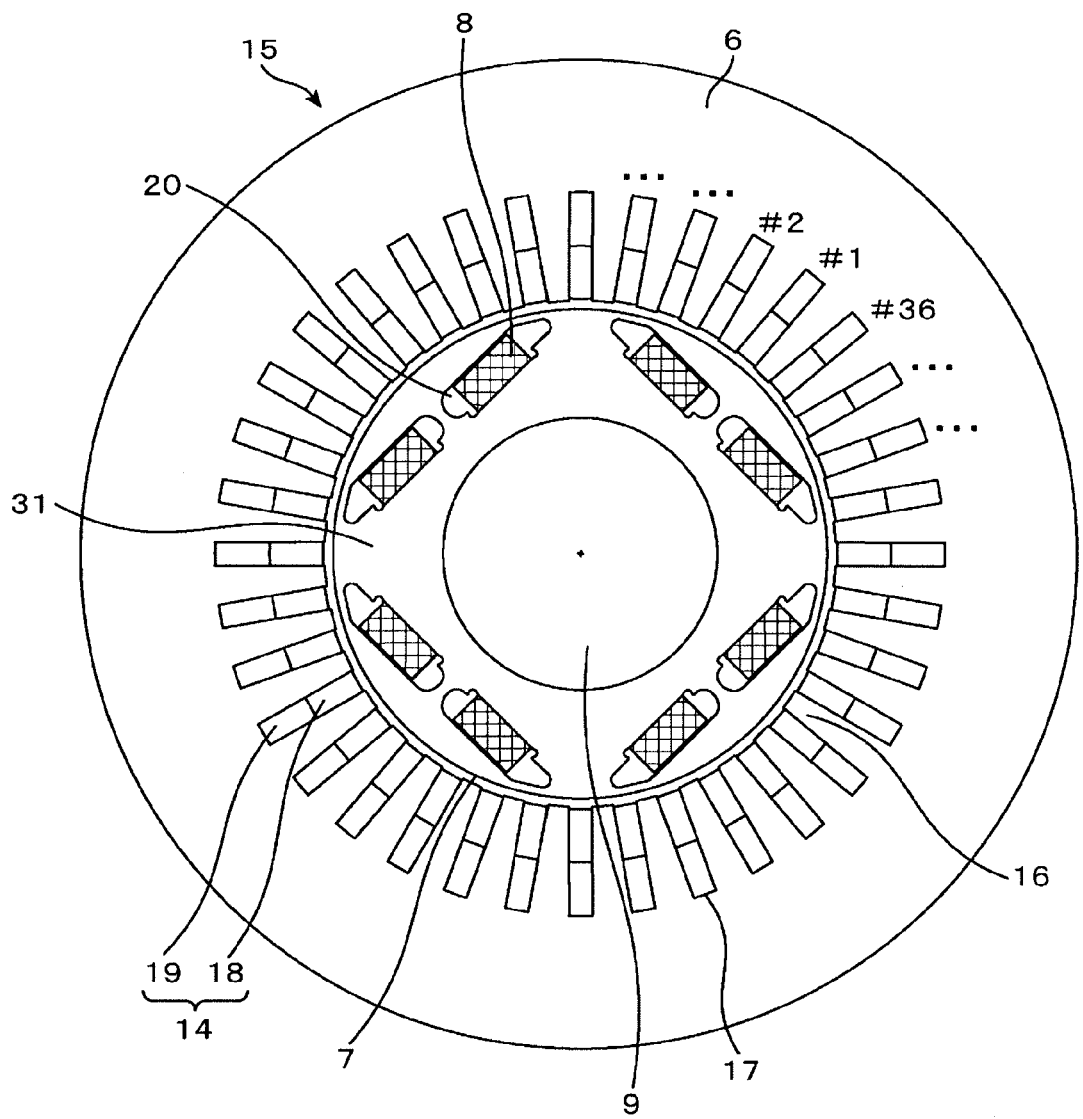
FIG. 2 is a cross-sectional view showing a permanent magnet pump motor according to the first embodiment of the present invention.

FIG. 2 is a cross-sectional view showing the motor portion. A permanent magnet motor 15 has four poles and 36 slots. The stator 6 is a distributed winding type including a cylindrical stator core and the coil 14. Specifically, the stator core includes a plurality of teeth 16 that protrude from a yoke portion to an inner peripheral surface.

The coil 14 is a wire wound using the teeth 16 in a distributed manner. The coil 14 is formed into three phase windings of U-phase, V-phase and W-phase and wound in a manner to form four poles electrically with the 36 slots. The coil 14 includes an upper coil 18 and a lower coil 19. Specifically, the upper coil 18 is disposed at an outer diameter side of each slot 17 formed between adjacent teeth 16 and the lower coil 19 is disposed at an inner diameter side of the slot 17. The coil 14 is wound by short-pitch winding that reduces eddy current loss as compared with full-pitch winding.

Numbers from #1 to #36 are assigned for convenience to the slots 17 in a counterclockwise direction. The coil 14 is connected such that a wire coming out from the lower coil 19 at slot #1 enters the upper coil 18 at slot #9. This connection style is repeated in the circumferential direction to thereby constitute the three-phase winding. The number of slot #9 is obtained by dividing the number of slots by the number of poles, specifically, dividing 36 by 4. Setting a ratio of a coil pitch to a pole pitch (short pitch degree) to ⅚ reduces spatial harmonics of 5th and 7th orders.

While the first embodiment of the present invention adopts the combination of four poles and 36 slots, combinations of other numbers of poles and slots, and combinations with concentrated winding or full-pitch winding may be used.

The rotor 7 is disposed so as to be rotatable coaxially with the stator 6. The shaft A 9 is fixed to a shaft of the electrical steel sheet 31 of the rotor 7. Two magnet insertion holes 20 constituting a single pole are disposed at an outer peripheral portion of the electrical steel sheet 31 of the rotor 7. The two magnet insertion holes 20 are oriented such that a magnetization direction of the permanent magnet 8 extends in parallel with a center of a single magnetic pole.

In addition, each of the two magnet insertion holes 20 is radially disposed so as to be away an equidistance from the center of rotation. Specifically, the two magnet insertion holes 20 are disposed in a line in a crosswise direction. This arrangement permits a smaller diameter for the rotor as compared with, for example, a V-shape arrangement. Having the yoke portion at an upper portion of the permanent magnet 8 also allows a salient pole ratio to be large. Having a large salient pole ratio allows reluctance torque to be increased, so that the amount of magnets used can be reduced.

Figure 3:
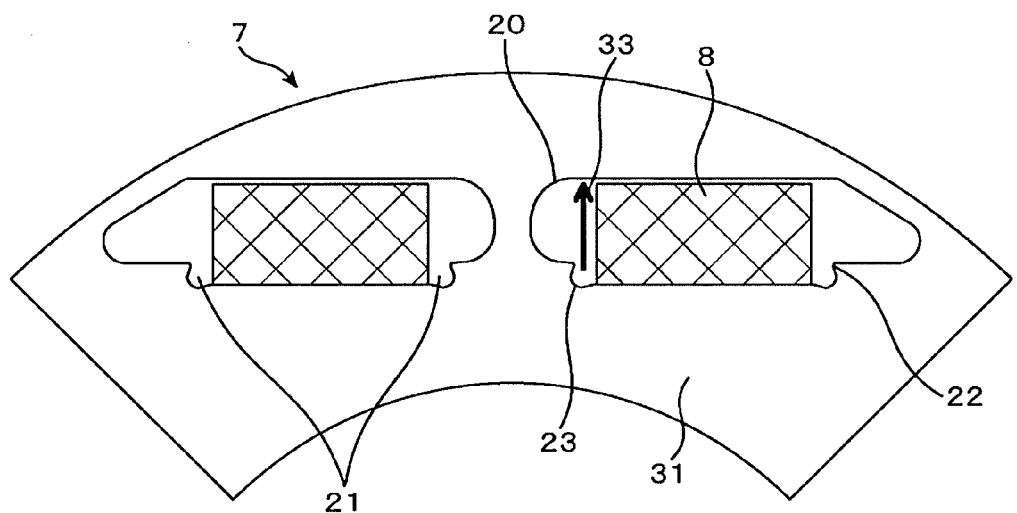
FIG. 3 is an enlarged view showing one pole of a rotor in the permanent magnet pump motor according to the first embodiment of the present invention.
Figure 4:
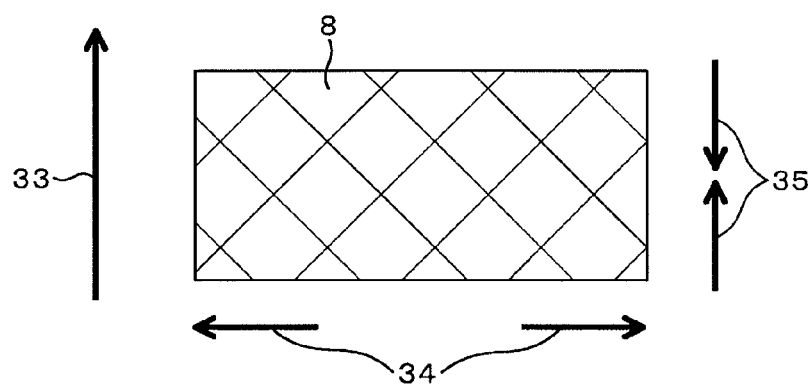
FIG. 4 is an illustration showing contraction and expansion of a magnet in the permanent magnet pump motor according to the first embodiment of the present invention.

FIG. 3 is an enlarged view showing one pole of the rotor 7. Referring to FIG. 3, the magnet insertion hole 20 has air gaps 21 disposed in a width direction of the permanent magnet 8 inserted therein on both ends of the permanent magnet 8. Referring to FIG. 4, if the permanent magnet 8 undergoes a change in temperature toward a low temperature side, the permanent magnet 8 contracts (35) in a direction parallel with a magnetization direction 33. This represents the same direction of linear expansion as that of the electrical steel sheet 31 used.

In contrast, the permanent magnet 8 expands (34) in a direction perpendicular to the magnetization direction 33. At low temperatures, the electrical steel sheet 31 contracts (35), so that without the air gaps 21, compression stress occurs in the electrical steel sheet 31 and the permanent magnet 8 and the electrical steel sheet 31 and the permanent magnet 8 may be deformed or damaged.

Additionally, pouring, for example, the adhesive as in JP-2006-311730-A to eliminate the air gap results in the electrical steel sheet 31, the permanent magnet 8, and the filler being deformed or damaged because of different directions of linear expansion as described earlier.

In addition, if air bubbles or the like are present in the filler, an environment of at an extremely low temperature of −162° C., as with the LNG, the sudden contraction of the air bubbles causes the filler, and the permanent magnet 8 and the electrical steel sheet 31 to be deformed or damaged.

As such, as with the first embodiment of the present invention, use under an extremely low temperature condition can be implemented by having the air gaps 21 on both ends of the permanent magnet 8 and not using the filler or any other similar agent.

The magnet insertion hole 20 also has shoulder portions 22 formed by way of the air gap 21 from both ends of the permanent magnet 8. Having the shoulder portions 22 prevents the permanent magnet 8 from being moved by a magnetic attractive force when a magnetized permanent magnet 8 is to be inserted in the magnet insertion hole 20, thus enhancing ease of the insertion process.

Referring to FIG. 3, a corner portion 23 that forms the shoulder portion 22 has a curved part and is shaped to bulge more toward the inside diameter side of the rotor 7 relative to a magnet surface in the magnetization direction of the magnet, on the inside diameter side of the rotor 7. This makes the radius of the curved part greater, thereby reducing stress concentration occurring locally.

Second Embodiment

Figure 5:
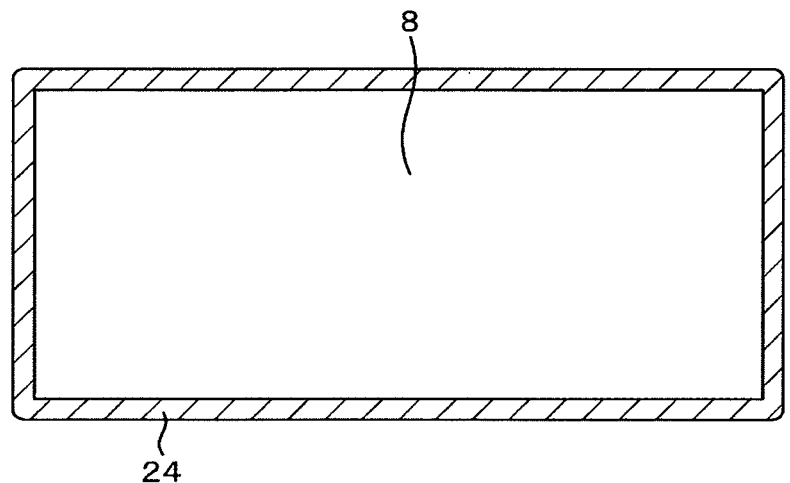
FIG. 5 is an illustration showing a protection for the magnet according to a second embodiment of the present invention.
Figure 6:
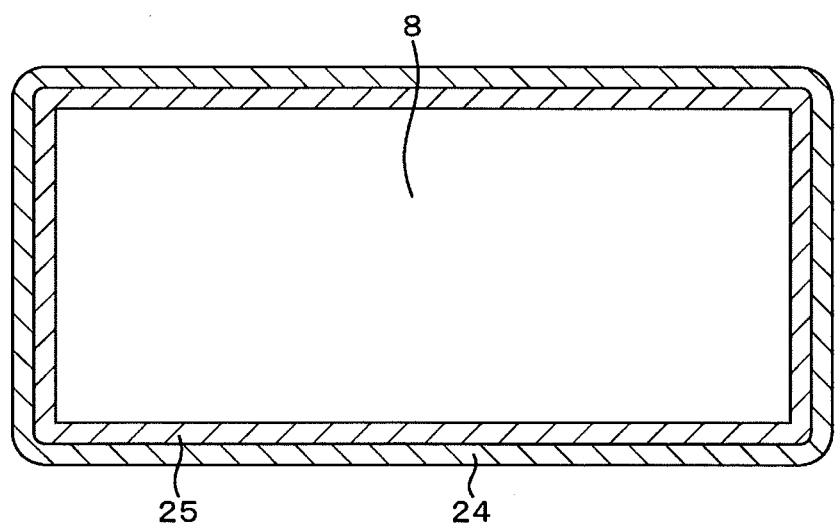
FIG. 6 is an illustration showing a protection for the magnet according to the second embodiment of the present invention.
Figure 7:
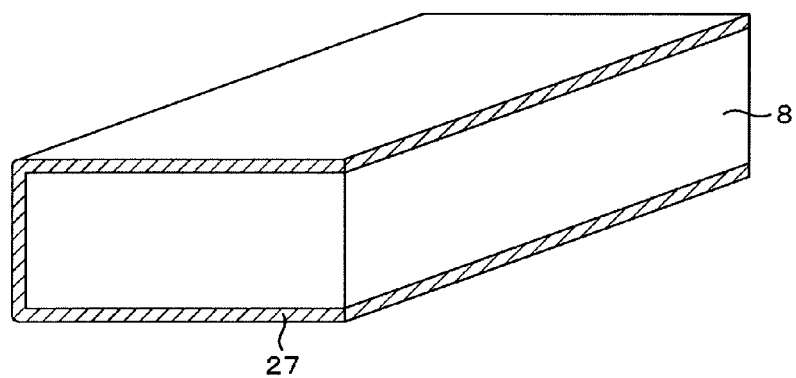
FIG. 7 is an illustration showing a protection for the magnet according to the second embodiment of the present invention.

FIGS. 5 to 7 are illustrations showing protections for the permanent magnet 8 according to a second embodiment of the present invention. Referring to FIG. 5, a coating 24 is applied to the entire permanent magnet 8. As described with reference to the first embodiment of the present invention, the air gaps 21 are disposed on both ends of the permanent magnet 8. The permanent magnet 8 is therefore expected to be moved by a centrifugal force. The permanent magnet 8, if moved in the magnet insertion hole 20, may have a damaged surface.

In the second embodiment of the present invention, the coating 24 is applied to the surface of the permanent magnet 8, thereby preventing the permanent magnet 8 from being damaged when moved in the magnet insertion hole 20. If the permanent magnet 8 is moved in the magnet insertion hole 20, the coating 24 can be shaved. Preferably, therefore, the coating 24 has a thickness as thick as possible. The coating 24 is also required to be formed of a material that exhibits chemical resistance to the LNG and stability at low temperatures. Teflon is an optimum choice for the material of the coating 24.

Referring to FIG. 6, the coating of the permanent magnet 8 may even be dual. For the dual coating, the first layer of the coating is metal plating 25, such as nickel plating, and the second layer of the coating is Teflon, epoxy, or the like. This allows the permanent magnet 8 to be protected with the second layer of the coating, should the first layer of the coating be scratched or separated.

The second embodiment of the present invention is also effective during assembly of the rotor 7, in addition to the protection of the permanent magnet 8 from damage during movement of the permanent magnet 8. If a magnetized permanent magnet 8, in particular, is used, the permanent magnet 8 is highly likely to contact a magnetic material and the coating 24 provides protection at such a time.

If coating of the permanent magnet 8 is not feasible, the same effect can also be achieved by a method of covering the permanent magnet 8 with a sheet 27 as shown in FIG. 7. When the magnetized permanent magnet 8 is to be inserted into the magnet insertion hole 20, covering the permanent magnet 8 with the sheet 27 in a U-shape turned sideways as shown in FIG. 7 prevents the sheet 27 from turning up during insertion into the magnet insertion hole 20.

Third Embodiment

Figure 8:
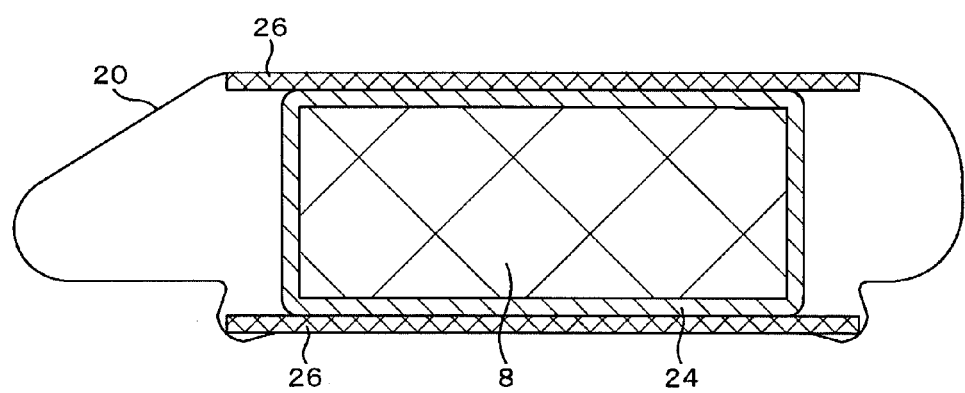
FIG. 8 is an illustration showing a protection for the magnet according to a third embodiment of the present invention.

FIG. 8 is an illustration showing a protection for the permanent magnet 8 according to a third embodiment of the present invention. Referring to FIG. 8, liners 26 are inserted at upper and lower portions in the magnetization direction of the permanent magnet 8 when the permanent magnet 8 is inserted in the magnet insertion hole 20.

Since the electrical steel sheet 31 is a laminate, microscopic irregularities exist inside the magnet insertion hole 20. The irregularities scratch or separate the coating when the permanent magnet 8 is inserted into the magnet insertion hole 20. The liners 26 prevent this from occurring.

For example, metal or thin Teflon, preferably having a smooth surface, is suitable for the material of the liner 26. If a metal liner 26 is used, harmonics affect to produce eddy current to thereby increase loss; however, splitting the liner 26 will reduce loss caused by the eddy current.

Heat generated from the liner 26 due to the eddy current does not pose any problem because the motor is used under a low temperature condition at −162° C. The third embodiment of the present invention can thus be said to comply with the condition of use in the LNG having a low temperature.

Fourth Embodiment

Figure 9:
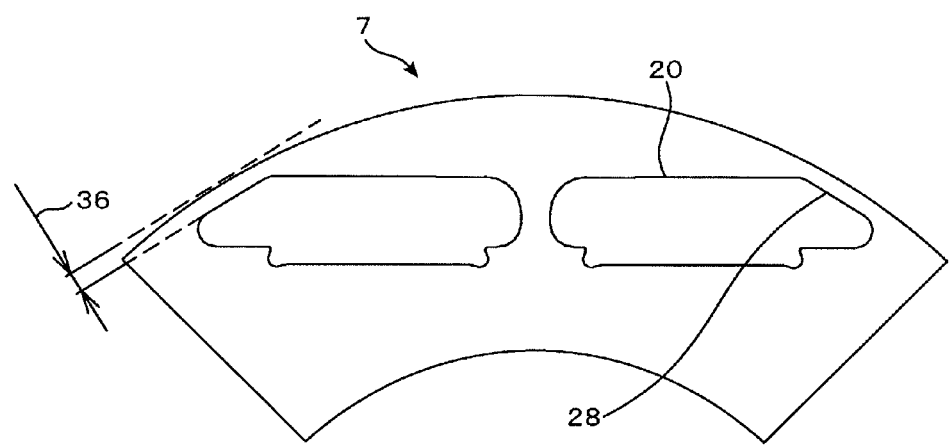
FIG. 9 is a cross-sectional view showing one pole of the rotor according to a fourth embodiment of the present invention.

FIG. 9 is a cross-sectional view showing one pole of the rotor 7. Referring to FIG. 9, the magnet insertion hole 20 has a rotor outside diameter side end portion wall 28 formed to extend in parallel (36) with the rotor outside diameter. Forming the rotor outside diameter side end portion wall 28 into such a shape allows flux leakage from the permanent magnet 8 to be reduced and no-load induced voltage to be increased.

Figure 10:
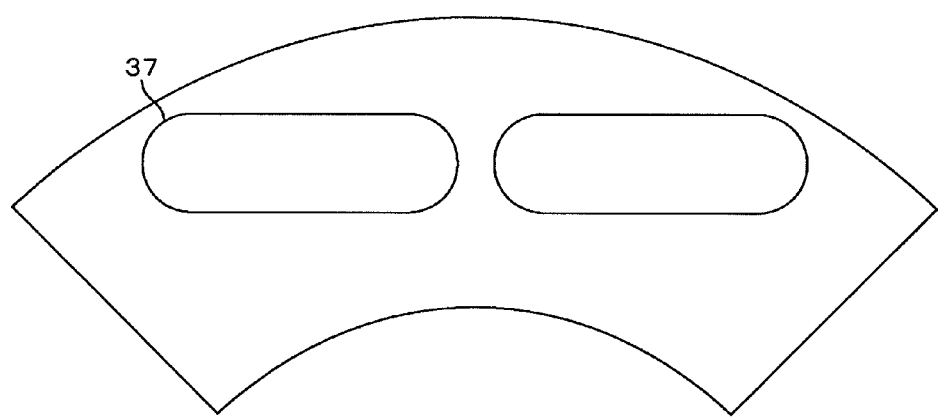
FIG. 10 is a cross-sectional view showing one pole of the rotor according to the fourth embodiment of the present invention.

Additionally, stress caused by a centrifugal force can be reduced. A comparison of the fourth embodiment with an arrangement in which a magnet insertion hole 20 having an oblong hole shape 37 is disposed at the same position as in the fourth embodiment as shown in FIG. 10 shows that the no-load induced voltage increases by about 3%.

Additionally, stress at an area near the rotor outside diameter side end portion wall 28 can be reduced by about 15%. Since the rotor outside diameter side end portion wall 28 affects a trade-off relationship between electric characteristics and strength characteristics, the application of the fourth embodiment improves the trade-off relationship.

Fifth Embodiment

Figure 11:
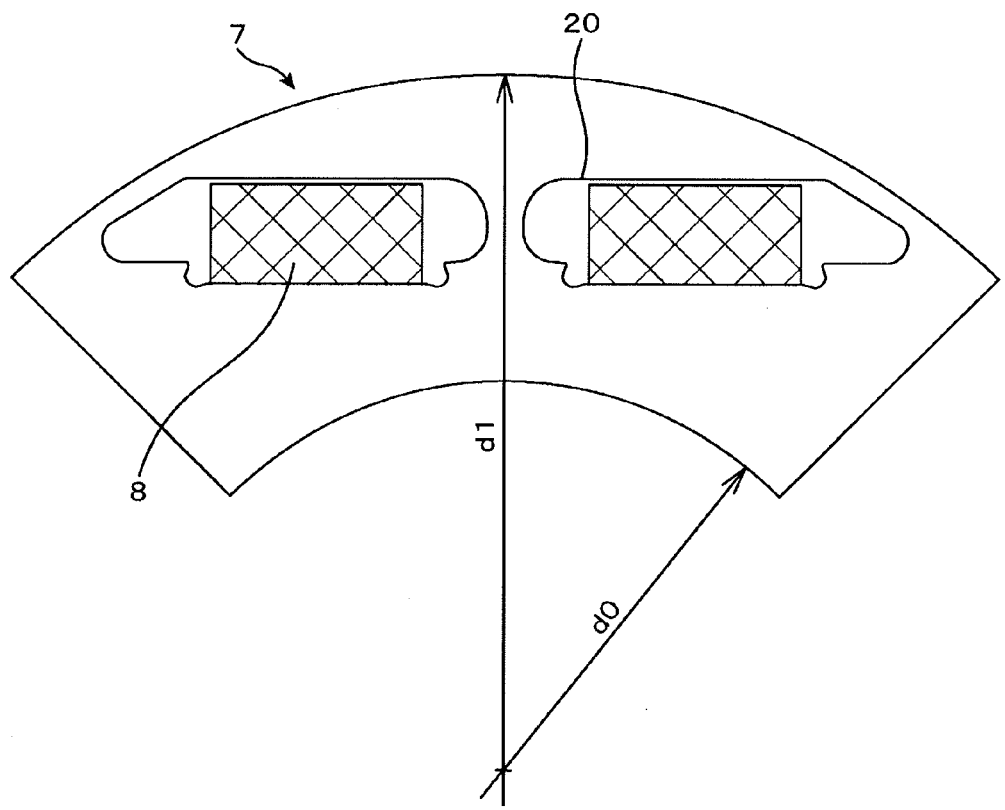
FIG. 11 is a cross-sectional view showing one pole of the rotor according to a fifth embodiment of the present invention.

FIG. 11 is a cross-sectional view showing one pole of the rotor 7 according to a fifth embodiment of the present invention and a relationship between an outside diameter d1 and an inside diameter do. Fluid friction loss of the permanent magnet motor 15 operated in the LNG may be given by expression (1) below with the rotor 7 being assumed to be a cylindrical object.

Expression 1

$$W_m = \xi \frac{2\pi R^4 \gamma L \omega^3}{2g} \quad (1)$$

where, Wm is fluid friction loss, R is rotor radius, γ is specific weight, L is axial length, ω is angular velocity, g is gravitational acceleration, and ξ is loss factor. If the motor is operated in the fluid, the fluid friction loss increases with the fourth power of the radius of the rotor 7 from expression (1).

Thus, increasing the diameter of the rotor 7 results in reduced efficiency of the permanent magnet motor 15. To increase efficiency of the permanent magnet motor 15, therefore, the diameter of the rotor 7 needs to be made as small as possible.

In the fifth embodiment of the present invention, if d1 is the rotor diameter and d0 is the rotor inside diameter, then d1/d0 is set such that 1.5≤d1/d0≤2.5 holds. The fifth embodiment of the present invention thereby achieves a permanent magnet motor 15 with reduced fluid friction loss.

The relational expression holds based on the disposition of the magnets described in the first embodiment of the present invention and is not valid if the magnets are disposed in a V-shape. The relational expression represents a range in which an electrical steel sheet area required for disposing the permanent magnets 8 can be ensured. If d1/d0 is set to be any figure smaller than 1.5, the area for disposing the permanent magnets 8 cannot be obtained.

Additionally, a problem of increasing stress arises, since the magnet insertion hole 20 and the rotor inside diameter are extremely close to each other. If d1/d0 is set to exceed 2.5, it follows that the inside diameter of the rotor 7 is made extremely small. Having a small inside diameter of the rotor 7 results in the shaft A 9 having a small diameter. This reduces stiffness of the shaft A 9, which is highly likely to result in poor torque transmission, increased vibration, deformation, and damage. Hence, preferably, 1.5≤d1/d0≤2.5.

Sixth Embodiment

Figure 12:
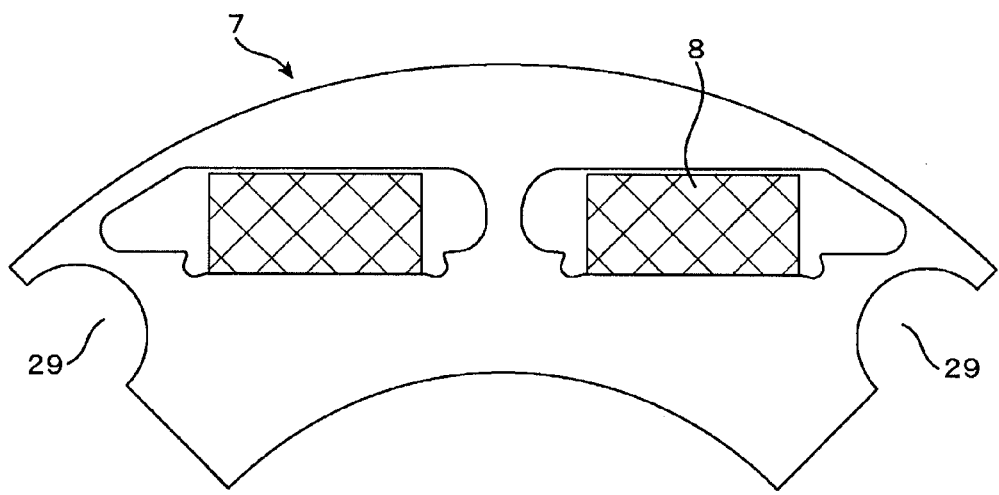
FIG. 12 is a cross-sectional view showing one pole of the rotor according to a sixth embodiment of the present invention.

FIG. 12 is a cross-sectional view showing one pole of the rotor 7 according to a sixth embodiment of the present invention. Referring to FIG. 12, an air layer 29 is disposed at an interpolar portion having different polarities in the rotor core, which prevents magnetic flux from entering from the interpolar portion. This increases the amount of magnetic flux going to the stator 8.

Additionally, loss caused by harmonics of the flux entering from the interpolar portion can be reduced. Specifically, core loss and eddy current loss occurring in the permanent magnet can be reduced, which improves efficiency of the permanent magnet motor 15.

Seventh Embodiment

Figure 13:
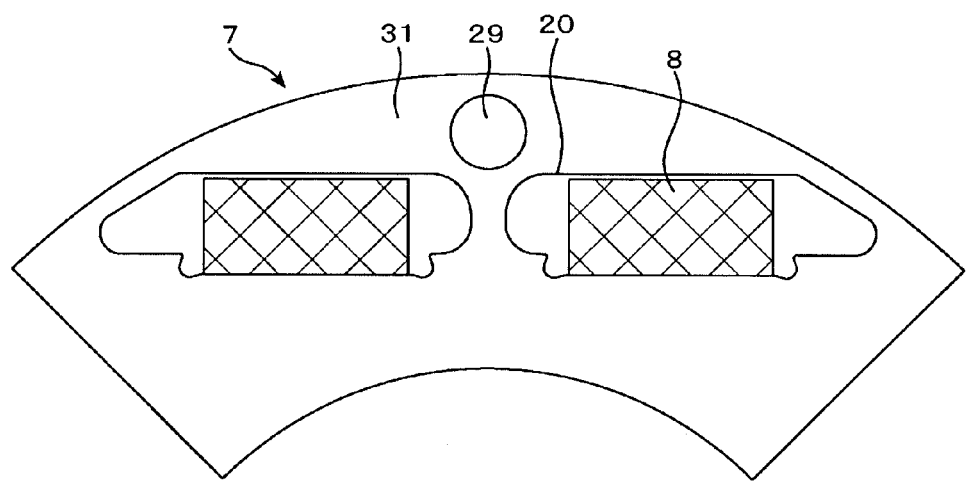
FIG. 13 is a cross-sectional view showing one pole of the rotor according to a seventh embodiment of the present invention.

FIG. 13 is a cross-sectional view showing one pole of the rotor 7 according to a seventh embodiment of the present invention. Referring to FIG. 13, an air layer 29 is disposed at a position of a magnetic pole central portion within the rotor core on the outside diameter side relative to the permanent magnet 8, so that mass of the electrical steel sheet 31 disposed on an upper portion of the permanent magnet 8 can be reduced.

It is noted that the centrifugal force acting on the magnet insertion hole 20 is the sum of the centrifugal force acting on the permanent magnet 8 and the electrical steel sheet 31 disposed on the upper portion of the permanent magnet 8. Since the centrifugal force is proportional to mass, having the air layer 29 as in the seventh embodiment of the present invention allows the centrifugal force on the electrical steel sheet 31 disposed on the upper portion of the permanent magnet 8 to be reduced, so that stress occurring in the magnet insertion hole 20 can be reduced.

Figure 14:
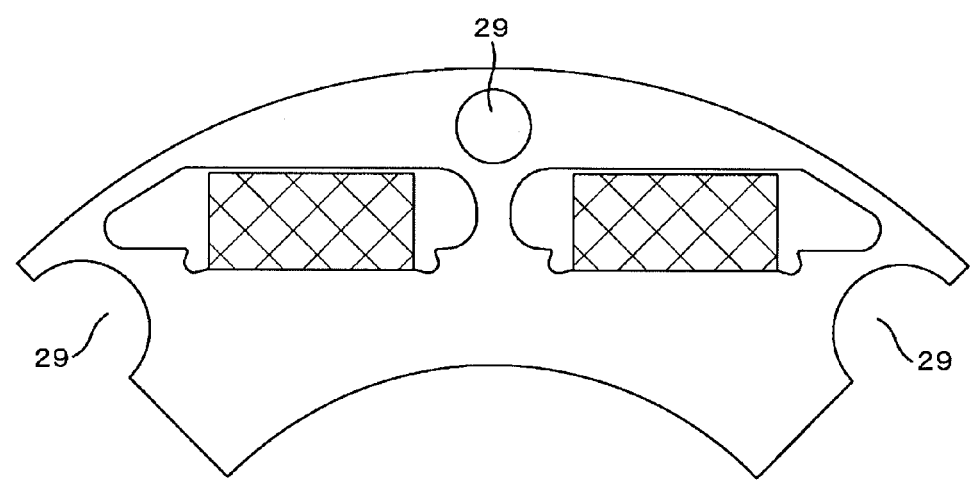
FIG. 14 is a cross-sectional view showing one pole of the rotor according to the seventh embodiment of the present invention.

The seventh embodiment of the present invention and the sixth embodiment of the present invention may be combined together, as shown in FIG. 14. The combination achieves effects from the seventh embodiment as well as the sixth embodiment of the present invention.

Eighth Embodiment

Figure 15:
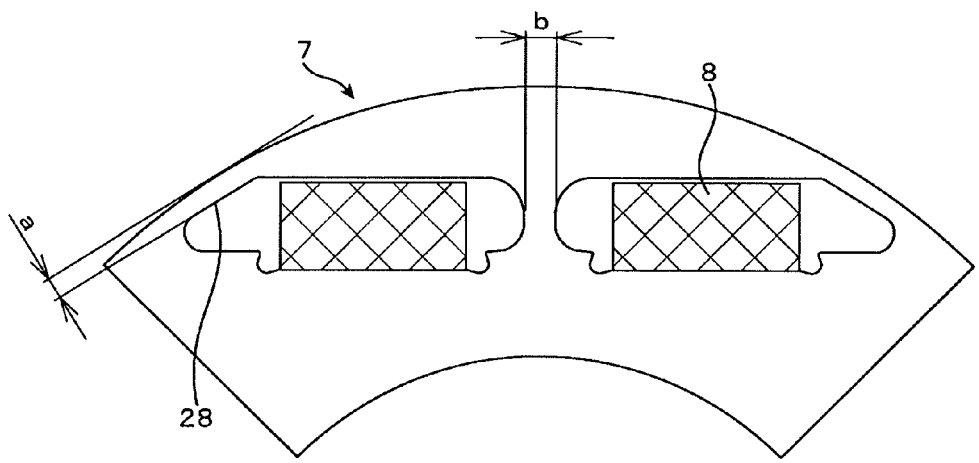
FIG. 15 is a cross-sectional view showing one pole of the rotor according to an eighth embodiment of the present invention.

FIG. 15 is a cross-sectional view showing one pole of the rotor 7 according to an eighth embodiment of the present invention. Referring to FIG. 15, let a be a connecting width formed between the rotor outside diameter side end portion wall 28 extending in parallel with the outside diameter of the rotor 7 and the outside diameter of the rotor 7 and let b be a connecting width formed between two magnets that represent the permanent magnet 8 constituting a single pole and divided into two about the magnetic pole center.

Then, a relationship of a>b holds. This relationship is valid based on the disposition of the magnets according to the first embodiment of the present invention. Stress occurring on the connecting width a and the connecting width b involves with this. Values of the stress relative to the connecting width a and the connecting width b are shown in FIG. 16.

Figure 16:
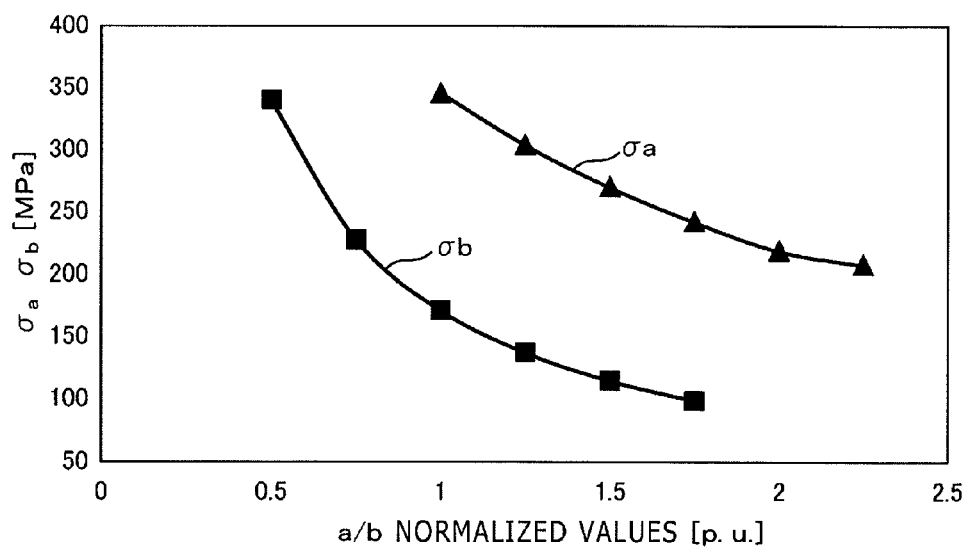
FIG. 16 is a graph showing values of stress in the permanent magnet pump motor according to the eighth embodiment of the present invention.

The abscissa in FIG. 16 represents the connecting width a normalized to 1 to give a/b ratios. The ordinate in FIG. 16 represents σa denoting the stress occurring on the connecting width a and σb denoting the stress occurring on the connecting width b. Comparing two stress values at the same point on the abscissa in FIG. 16 indicates that σa is higher than σb.

This relationship is valid invariably when the magnets are disposed at right angles with the magnetic pole center and the magnet insertion holes 20 are shaped as in the present invention. This is because the stress component at the connecting width a portion is a bending stress, while the stress component at the connecting width b portion is a tensile stress.

In addition, the two connecting widths are such that electric characteristics and strength characteristics are in a trade-off relationship. Narrowing the two connecting widths prevent flux that short-circuits from the permanent magnet 8, which requires that the two connecting widths be narrowed up to a limit with which a required strength can be achieved.

The relationship of a>b is reached, if the rotor has the above-described structure and the connecting widths a and b are narrowed to a limit with which a required strength can be achieved. This optimizes both the electric characteristics and the strength characteristics.

Ninth Embodiment

Figure 17:
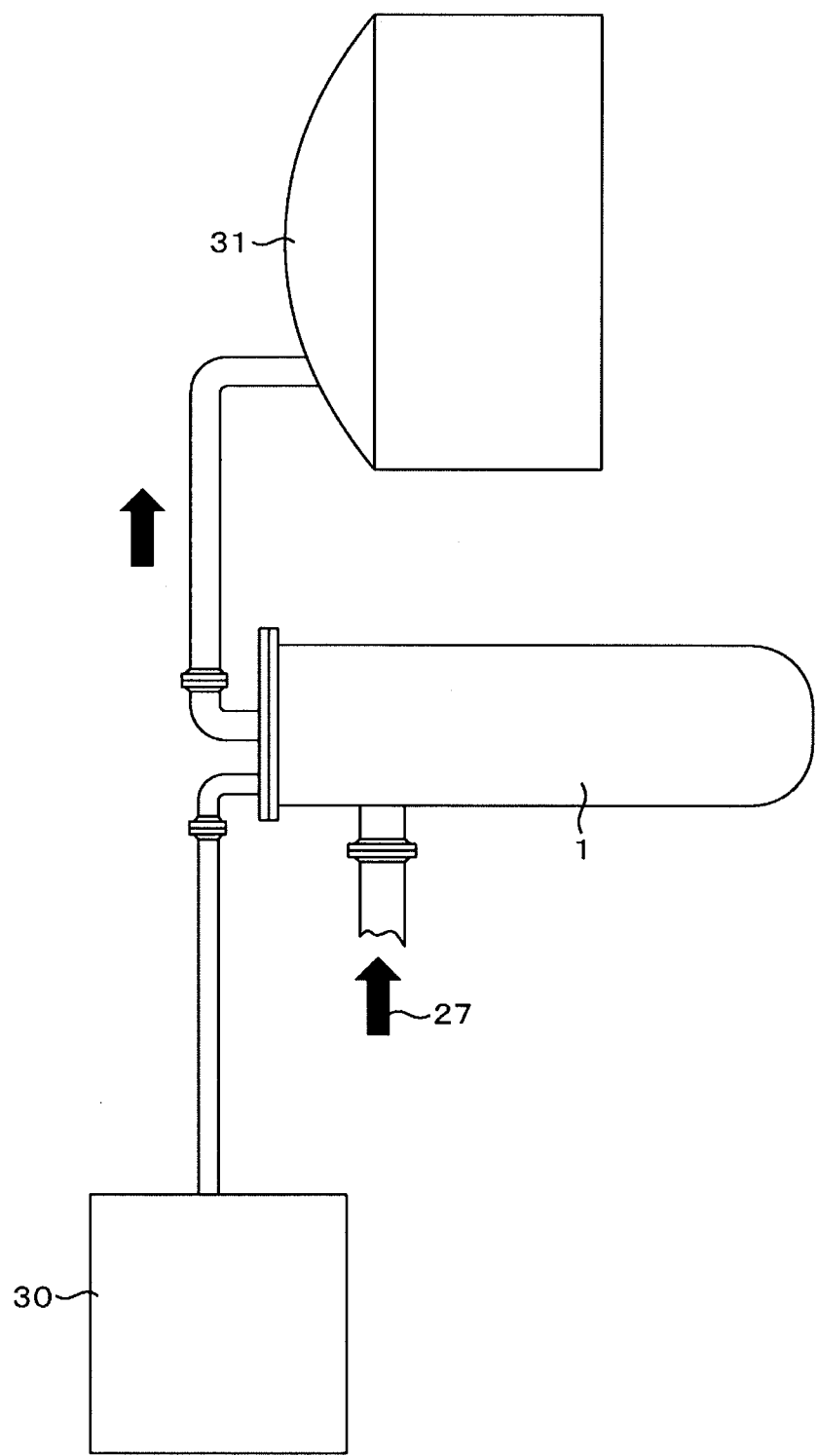
FIG. 17 is a diagram showing an exemplary LNG plant to which the permanent magnet pump motor according to the embodiments of the present invention is applied, representing a ninth embodiment of the present invention.

FIG. 17 is a diagram showing an exemplary LNG plant to which the permanent magnet pump motor according to the embodiments of the present invention is applied. The LNG plant includes a permanent magnet pump motor 1 embodied according to the first to seventh embodiments of the present invention, the inverter 30, and an LNG storage tank 31.

The permanent magnet pump motor 1 is driven to thereby feed the LNG 27 to the LNG storage tank 31. The inverter 30 supplies the permanent magnet pump motor 1 with three-phase power to thereby operate the permanent magnet pump motor 1 at variable speeds.

The present invention is also applicable to a ground plant or an ocean vessel. In addition, the permanent magnet pump motor can also be used as a generator.

What is claimed is:

1. A permanent magnet pump motor having a permanent magnet rotating electric machine that includes a rotor and a stator, the rotor comprising:
   a permanent magnet forming a single pole within a rotor core of the rotor, the permanent magnet being divided into two across a magnetic pole center and arranged such that the magnetic pole center and a magnetization direction of the permanent magnet extend in parallel with each other;
   a connecting portion assuming an electrical steel sheet disposed between the two divided permanent magnets; and
   magnet insertion holes in which the permanent magnets are inserted, wherein
   each of the magnet insertion holes is shaped to include:
   air gaps at both end portions in a width direction that is perpendicular to the magnetization direction of the permanent magnet, each air gap being formed between all of an end surface of the end portions and the electrical steel sheet in each of the magnet insertion holes;
   a shoulder portion disposed on the facing surface, the shoulder portion having a length shorter than a thickness in the magnetization direction of the permanent magnet; and
   another air gap extending toward a rotor outside diameter side and the magnetic pole center side in a direction perpendicular to the shoulder portion on an outside of the shoulder portion.

2. The permanent magnet pump motor according to claim 1, wherein:
   a coating is applied to the permanent magnet.

3. The permanent magnet pump motor according to claim 1, wherein:
   the permanent magnet is inserted in the magnet insertion hole in the rotor; and
   liners are inserted at upper and lower portions in the magnetization direction of the permanent magnet.

4. The permanent magnet pump motor according to claim 1, wherein:
   the magnet insertion hole has a rotor outside diameter side end portion wall formed to extend in parallel with the rotor outside diameter.

5. The permanent magnet pump motor according to claim 1, wherein:
   if $d1$ is a rotor outside diameter and $d0$ is a rotor inside diameter, then $d1/d0$ is set such that $1.5 \leq d1/d0 \leq 2.5$ holds.

6. The permanent magnet pump motor according to claim 1, wherein:
   an air layer is disposed at an interpolar portion having different polarities in the rotor core of the rotor.

7. A permanent magnet pump motor system comprising a permanent magnet pump motor according to claim 1.

8. The permanent magnet pump motor system according to claim 7, wherein:
   an air layer is disposed at a position of a magnetic pole central portion within the rotor core on the outside diameter side relative to the permanent magnet.

9. The permanent magnet pump motor system according to claim 7, wherein:

if $a$ is a connecting width formed between the rotor outside diameter side end portion wall extending in parallel with the outside diameter of the rotor and the outside diameter of the rotor and $b$ is a connecting width formed between the two permanent magnets that represent the permanent magnet forming a single pole and divided into two about the magnetic pole center, then a relationship of $a>b$ holds.

10. The permanent magnet pump motor system according to claim 7, wherein:
    the permanent magnet pump motor is disposed on a liquefied natural gas plant.

11. A permanent magnet pump motor having a permanent magnet rotating electric machine that includes a rotor and a stator, the rotor comprising:
    a permanent magnet forming a single pole within a rotor core of the rotor, the permanent magnet being divided into two across a magnetic pole center and arranged such that the magnetic pole center and a magnetization direction of the permanent magnet extend in parallel with each other, the two permanent magnets being disposed so as to be away an equidistance from a center of rotation;
    a connecting portion assuming an electrical steel sheet disposed between the two divided permanent magnets; and
    magnet insertion holes in which the permanent magnets are inserted, wherein
    each of the magnet insertion holes is shaped to include:
    air gaps at both end portions in a width direction that is perpendicular to the magnetization direction of the permanent magnet, each air gap being formed between all of an end surface of the end portions and the electrical steel sheet in each of the magnet insertion holes;
    a shoulder portion disposed on the facing surface, the shoulder portion having a length shorter than a thickness in the magnetization direction of the permanent magnet; and
    another air gap extending toward a rotor outside diameter side and the magnetic pole center side in a direction perpendicular to the shoulder portion on an outside of the shoulder portion.

12. The permanent magnet pump motor according to claim 11, wherein:
    a coating is applied to the permanent magnet.

13. The permanent magnet pump motor according to claim 11, wherein:
    the permanent magnets are inserted in the magnet insertion holes in the rotor; and
    liners are inserted at upper and lower portions in the magnetization direction of the permanent magnet.

14. The permanent magnet pump motor according to claim 11, wherein:
    the magnet insertion holes have a rotor outside diameter side end portion wall formed to extend in parallel with the rotor outside diameter.

15. The permanent magnet pump motor according to claim 11, wherein:
    if $d1$ is a rotor outside diameter and $d0$ is a rotor inside diameter, then $d1/d0$ is set such that $1.5 \leq d1/d0 \leq 2.5$ holds.

16. The permanent magnet pump motor according to claim 11, wherein:
    an air layer is disposed at an interpolar portion having different polarities in the rotor core of the rotor.

17. A permanent magnet pump motor system comprising a permanent magnet pump motor according to claim 11.

18. The permanent magnet pump motor system according to claim 17, wherein:
    an air layer is disposed at a position of a magnetic pole central portion within the rotor core on the outside diameter side relative to the permanent magnet.

19. The permanent magnet pump motor system according to claim 17, wherein:
    if a is a connecting width formed between the rotor outside diameter side end portion wall extending in parallel with the outside diameter of the rotor and the outside diameter of the rotor and b is a connecting width formed between the two permanent magnets that represent the permanent magnet forming a single pole and divided into two about the magnetic pole center, then a relationship of a>b holds.

20. The permanent magnet pump motor system according to claim 17, wherein:
    the permanent magnet pump motor is disposed on a liquefied natural gas plant.

* * * * *